Sheet 1-2 Sheets.
C. Duckworth.
Loom.
No. 2,193.
Reissued Mar. 13, 1866.
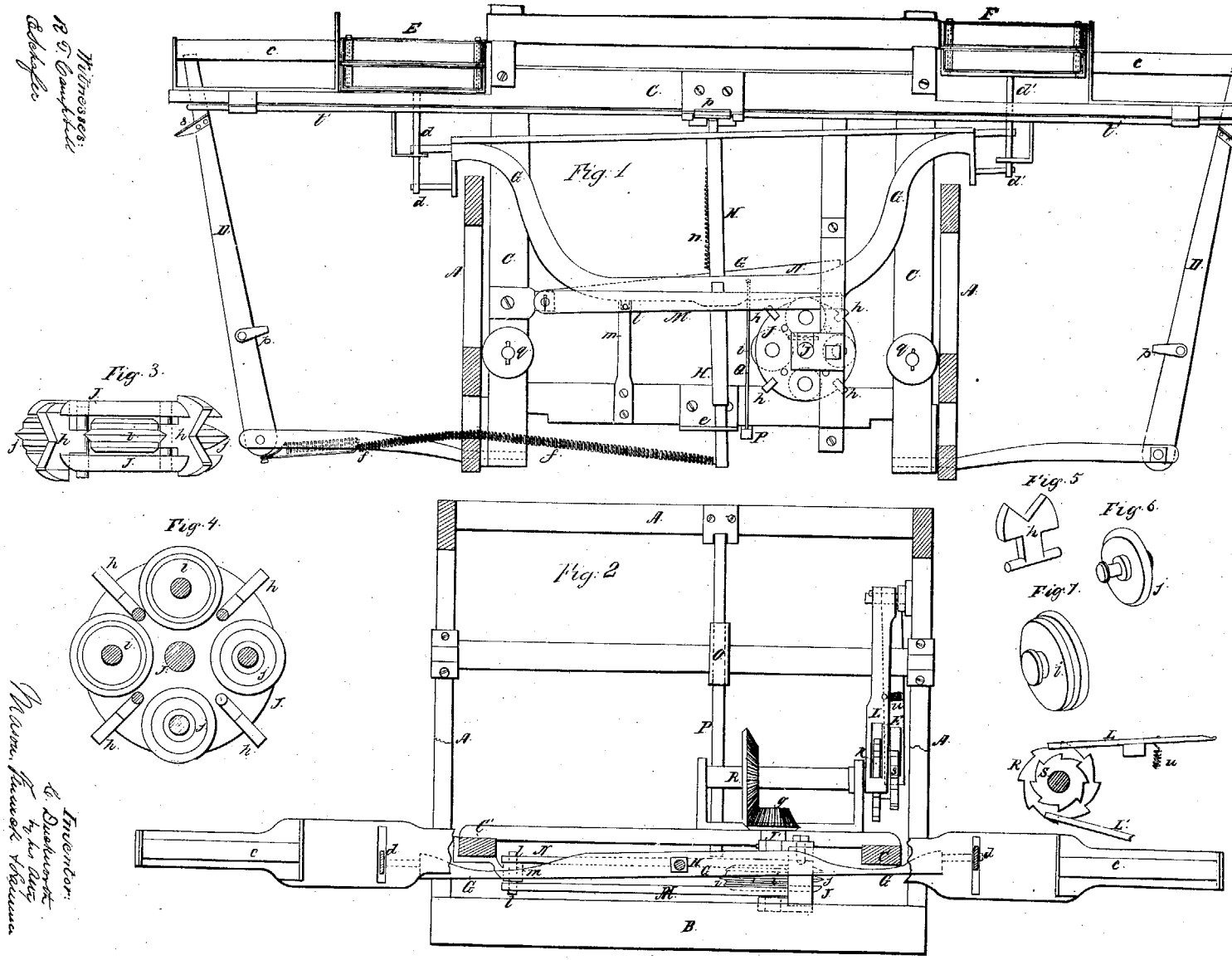
Witnesses:
R. T. Campbell
E. Schafer
Inventor:
C. Duckworth
by his Atty
Mason, Fenwick & Lawrence
N. PETERS, PHOTO-LITHOGRAPHER, WASHINGTON, D. C.

C. Duckworth.
Loom.
No. 2,193.
Reissued Mar. 13, 1866.
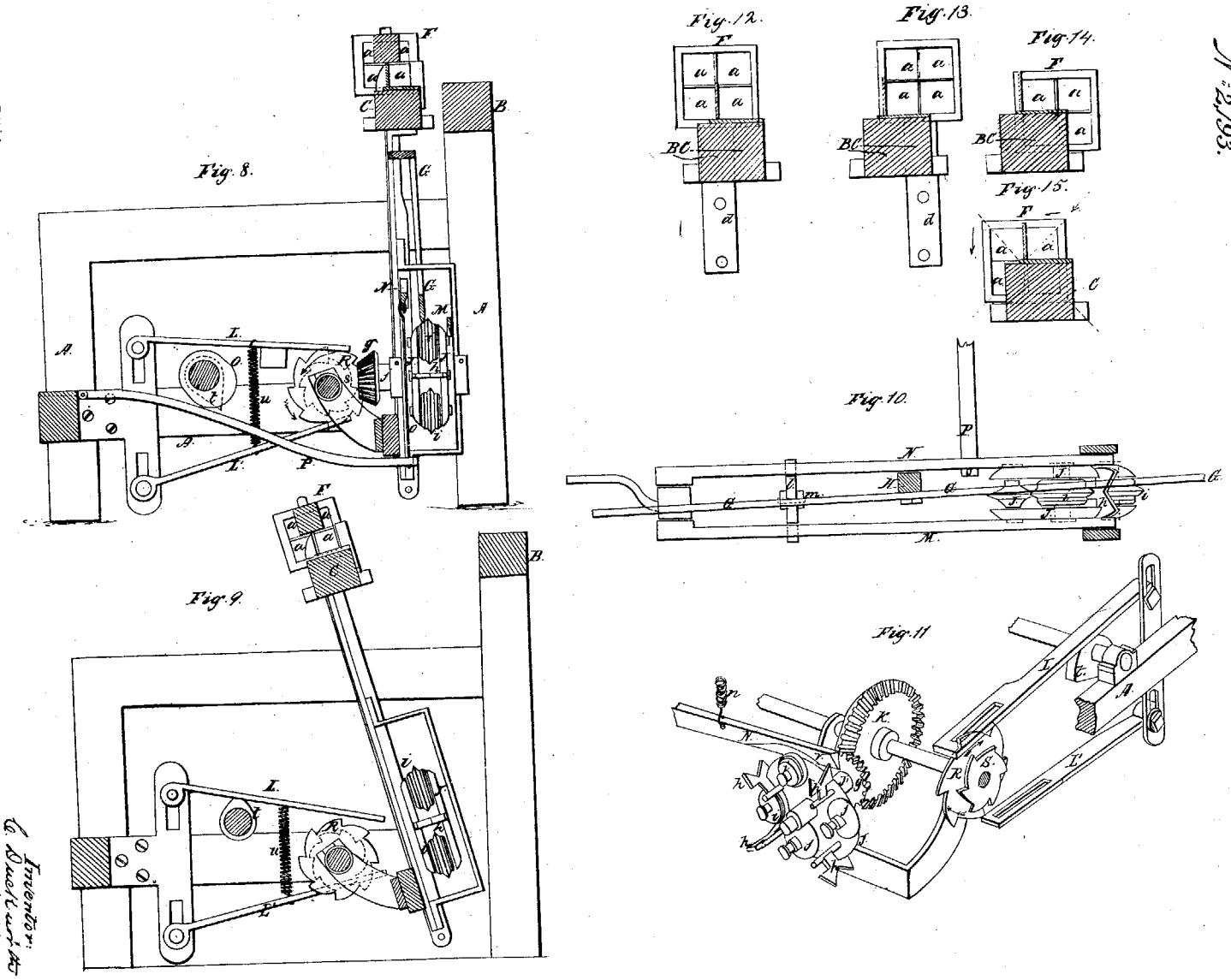
Witnesses:
R. T. Crawfshell
Inventor:
C. Duckworth
by his Atty
Mason, Fenwick & Lawrence
N. PETERS, PHOTO-LITHOGRAPHER, WASHINGTON, D. C.

UNITED STATES PATENT OFFICE.

CHRISTOPHER DUCKWORTH, OF MOUNT CARMEL, CONNECTICUT.

IMPROVEMENT IN POWER-LOOMS.

Specification forming part of Letters Patent No. 9,815, dated June 28, 1853; Reissue No. 2,019, dated July 4, 1865; Reissue No. 2,193, dated March 13, 1866.

DIVISION A.

*To all whom it may concern:*

Be it known that I, CHRISTOPHER DUCKWORTH, of Mount Carmel, in the county of New Haven and State of Connecticut, have invented certain Improvements in Power-Looms for Weaving Figured Fabrics; and I do hereby declare that the following is a full and correct description thereof.

My said invention relates to the movement of shifting shuttle-boxes in a vertical direction by means of reversible revolving tappets.

Hitherto the revolving-tappets used in looms to move the shifting shuttle-boxes in a vertical direction have been so arranged and combined with the moving parts of the loom as to revolve only in one direction, having no means of reversing the motion of the tappet-shaft with respect to the other moving parts of the loom.

My said invention consists, first, in combining revolving tappets used in looms to give motion to the shuttle-boxes in a vertical direction with a reversible ratchet mechanism, substantially as herein described, whereby the motion of the revolving tappets may be reversed at every beat of the lay, or as often as desired, and, second, in combining revolving tappets used in looms to give motion to the shuttle-boxes in a vertical direction, and the reversing ratchet mechanism, with the pattern mechanism of the loom, substantially as herein described, whereby the time and direction of the motion of the revolving tappets are automatically regulated and controlled.

In carrying out my invention in the loom hereinafter described, I have placed the tappet-shaft and the reversing ratchet-wheel upon the swords or frame of the lay, and the pawl upon a pivot on the frame of the loom, so as to time the movement of the tappets with the beat of the lay.

But more particularly to describe my invention, I will refer to the annexed drawings, which illustrate its application in a loom containing other improvements invented by me and patented in other patents.

Figure 1, Sheet 1, is a front elevation of those parts of a power-loom to which my invention relates. Fig. 2, Sheet 1, is a horizontal section through Fig. 1, taken immediately beneath the race-beam. Figs. 3, 4, 5, 6, and 7 are views in detail of the devices which take part in effecting the changes of position of the shuttle-boxes. Fig. 8, Sheet 2, is a longitudinal section through the center of the loom with the beveled spur-wheel omitted. Fig. 9, Sheet 2, is a similar section showing the same parts in different positions. Fig. 10, Sheet 2, is a top view of the levers which give a horizontal lateral movement to the shuttle-boxes, either backward or forward. Fig. 11, Sheet 2, is a perspective view showing the pawls, ratchet-wheels, and spurred gearing which move the tappet-wheel about their common center, either to the right or to the left. Figs. 12, 13, 14, and 15 show the changes of position of a four-celled shuttle-box.

Similar letters of reference indicate corresponding parts.

The frame A, the breast-beam B, the lathe C, and the picker-staves D D may be constructed in any of the well-known ways used in power-looms. The shuttle-boxes E and F are subdivided by partitions so as to form a number of cells, *a a a*, for containing the shuttles, and these boxes are so arranged that they are susceptible of receiving a lateral, a vertical, and a diagonal movement when necessary to bring the required shuttle to the position to be acted upon by the picker-staves D D, which latter give an alternate reciprocating motion to their respective bolts or rods which are inclosed within the horizontal tubes *c c*. The shuttle-boxes E F are supported upon upright standards *d d'*, Figs. 1 and 2, which standards are acted upon by means of pins projecting from the extremities of a curved rocking-lever, G. This lever, G, is secured at its center to a swinging bar, H, which is supported in a free-bearing at its upper end, (attached to the race-beam of the lathe C,) while its lower end is movable laterally in a slotted plate, *e*, and is pressed toward the left by the spiral spring *f*, so as to cause the lever G to bear in the center of the notches in the slides *h*, and rest on the friction-rollers *i i* and *j j*, contained in the circular case J. This case, J, with its friction-rollers, is revolved or oscillated when necessary by the bevel gear-wheels K *g*, Figs. 2, 8, and 11, these wheels being worked by the dogs or pawls L L′ and ratchet-wheels R S, Figs. 8 and 11, by the vibratory motion of the lathe C, to which latter the case J, wheels K and *g*, and the ratchet-wheels are all attached.

The two pawls L and L′ may, for some purposes, be worked by a cam, as shown at *t*, Figs. 8, 9, and 11, which cam will raise the pawl L from the ratchet-wheel R, which, by means of the spiral spring *n*, will lift the pawl L′ against the ratchet-wheel S, so as to move the case J about its axis in one direction, contrary to that in which it is moved when the pawl L is allowed to act upon the ratchet-wheel R. But instead of using a single cam, *t*, to act upon the pawls L L′, I shall in most if not all cases employ a "card-pattern" for moving and controlling the movements of said pawls. The case J contains four friction-rollers, *i i* and *j j*, the forms of which are particularly shown in Figs. 6 and 7, sheet 1. The object of making these portions, *i i*, *j j* of a circular form and allowing them to turn freely is merely to avoid friction when their surfaces are caused to act upon the lever G. The case J is also furnished with four notched slides *h* the notches of which guide the lever G laterally as it falls into them. These slides, *h*, are moved from one side to the other of the center of the case J by means of two levers, M and N, which are alternately depressed, so as to bring the beveled edge of one or the other of these levers in contact with the projecting portions of these slides. The slides *h* have sufficient end play to carry the lever G from one side to the other of the central prominences of the tappets or friction-rollers *i i j j*, and thereby cause this lever to give the lateral motions to the shuttle-boxes, as the levers M and N are alternately depressed. The friction-rollers *i i j j* are used for giving a vertical up-and-down movement to the shuttle-boxes as the shaft J′ is moved about its axis, and the slides *h h* are used for giving a lateral or horizontal movement to the shuttle-boxes; both devices operate as tappets upon the lever G, which carries on its extremities the shuttle-boxes. The levers M and N are pivoted to a bracket, which is secured to the left-hand sword of the lathe, and these levers are connected together by a short transverse lever, *l*, which rocks on a fulcrum, *m*, so that when one lever is depressed the other will be elevated. The lever N is elevated by the recoil of the spiral spring *n*, the upper end of which is attached to the under side of the race-beam of the lathe C and and the lower end to the lever N, as seen in Fig. 1; and this lever is depressed by the action of the cam O on the lever P by means of the connecting-rod Q, and by the operation of the rocking-lever *l*, when lever N is elevated, the lever M is depressed, and vice versa, so far as the cam O is concerned in the operation while working alone. This cam O may be shifted or adjusted to any desired position so as to operate the levers M and N, as required, to the extent to which a single cam can be used; but I prefer to control the operation of the levers M and N by means of a card-pattern instead of a single cam-surface, as shown.

When the card-pattern is employed, the cam O should be dispensed with and the operation of the levers governed wholly by the pattern, the operation of the rocking lever *l* being to prevent both levers M N from being depressed simultaneously, while the operation governed by the pattern may be to hold up either one of the levers for any length of time.

On the arbor of wheel K, I key two ratchet-wheels, R and S, for the purpose of revolving the wheel K either way by means of the vibratory motion given to the lathe C and the stationary pawls L L′, acting alternately upon their respective ratchet-wheels, as represented in Figs. 8 and 9, Sheet 2. Either one of these pawls may be raised or depressed, or both may be disengaged from the ratchet-wheels when not needed by any of the common methods used in looms to direct the form of the figure to be woven, though they must be governed by a card-pattern either directly or indirectly.

The power for working the lathe C may be applied in any of the well-known ways so as to revolve the main shaft, which latter communicates a rotary motion to the shaft carrying the cam O through the medium of spurred gearing, which I have not represented in the drawings.

When power is applied to the main driving-shaft, the lathe C receives a vibratory motion for beating up the woof or filling. This vibratory motion of the lathe causes the ratchet-wheels R S to be revolved by the pawl L in the direction indicated by the arrows in Fig. 8, and to carry with it the bevel spur-wheel K, which, by means of the pinion *g* on the shaft J′, revolves or moves the case J toward the right by a repeated movement, and when the other pawl, L′, is brought into action, as in Fig. 9, Sheet 2, the motion of the lathe C causes the ratchet-wheel S to revolve in the direction indicated by the arrows on this wheel in Fig. 9, and carries with it the wheel K, which, by means of pinion *g*, revolves or moves the case J over toward the left by a repeated movement, so as to bring the notched slides *h* and friction-rollers *i i j j* alternately or successively under the lever G to guide it and to rock it so as to alternately depress and elevate the shuttle-boxes E F or to give them a vertical motion. While this takes place the shaft of cam O will be revolved, and this cam will be caused to depress the lever P once in every revolution, and by means of the connecting-rod Q depress the lever N so that its beveled edge will force the notched slides outward, and thus guide the lever G outside of the prominences on the rollers or tappets *i i j j*, and thus give the lateral motion to the shuttle-boxes, carrying the box E back and bringing the box F forward.

When the shortest side of the cam O is downward, the spiral spring *n*, Fig. 1, will raise the lever N above the ends of the slides *h*, and by the operation of the transverse lever *l* the lever M will be correspondingly depressed, (unless sustained by the governing effect of a card-pattern,) so that its beveled edge will come into contact with the beveled edges of the notched slides *h*, and force these slides back, and thereby guide the lever G to the back side of the central prominences on the friction-rollers or tappets, and cause this lever to carry the shuttle-box F backward and bring box E forward, thus giving a lateral movement to the shuttle-boxes opposite to that before described.

When the change in the slide to give the lateral or horizontal movement to the boxes coincides with the change in the friction-rollers or tappets, as from *i* to *j*, or vice versa, to give the vertical movements, the lateral and vertical movements occurring simultaneously will produce the diagonal motion as from corner to corner of the shuttle-boxes, as indicated by the red lines, Fig. 15. The slides *h* and rollers or tappets *i i j j*, when the pawls L L′ and the levers N M are properly controlled in their movements, will cause the lever G to produce every change of position of the shuttle-boxes required to weave the desired figure. The case J may remain at rest during any number of throws of either one of the shuttles, and this case may be rotated forward or backward, as one or the other of the pawls L L′ and ratchet-wheels R S are used, and when the pawl L and the ratchet-wheel S are used the inclined surface *v*, Fig. 11, will operate the notched slides *h*. When I employ a card-pattern, I connect it with the pawls L L′ and the levers M N by any of the well-known means now in use for similar purposes, according to the construction of the loom.

The picker-staves D D may be operated in any of the well-known ways—as, for instance, by bands or straps attached at *p p* and carried over the pulleys *q q*, Fig. 1, and worked by a treadle or any other convenient way.

The loom may be stopped when the shuttles are not thrown home into the boxes by the lip or projection *r*, Fig. 1, (which is thrown by a spring in the usual manner,) coming in contact with the breast-beam B, and when the shuttle is thrown home into the boxes the inclined planes *s s*, acting on the bent ends of the protecting-rod *t′*, will press the lip *v* down so that it will pass under the breast-beam B and allow the lathe to work freely.

I am aware that a reversible mechanism has been used for moving shuttle-boxes up and down, such as is described in the Letters Patent to Erastus J. Bigelow, commonly known as "Bigelow's ingrain loom-patents and plaid loom-patent"; but such mechanism differs from mine in respect that the reversing ratchet mechanism is combined with the shuttle-boxes by means of a wheel and axle and chain, or by a rack and pinion—devices which differ substantially from revolving tappets arranged to sustain the shuttle-boxes without a counterbalance, and, moreover, such devices do not, like mine, move them a greater or less distance in the same time, according to the relative distance of their working or acting surfaces from their axis or center of motion.

I claim as my invention and improvement in looms having shifting shuttle-boxes—

1. The combination of a reversible ratchet mechanism with the reversible revolving tappets used in the loom to move the shuttle-boxes in a vertical direction, substantially as and for the purpose described.

2. The combination of the pattern mechanism of the loom with a reversible ratchet mechanism and the reversible revolving tappets, substantially as and for the purpose described.

C. DUCKWORTH.

Witnesses:

WM. DUCKWORTH,

LEVERETT HITCHCOCK.